United States Patent [19]

Farkas et al.

[11] Patent Number: 5,802,219
[45] Date of Patent: Sep. 1, 1998

[54] METHODS AND APPARATUS FOR TABLE LOOKUP TRANSFORMATION OF DIGITAL IMAGES

[75] Inventors: Peter Farkas, Santa Cruz; Stephen K. Howell, Santa Clara; Daniel S. Rice, Oakland, all of Calif.

[73] Assignee: Sun Microsystems, Inc., Palo Alto, Calif.

[21] Appl. No.: 562,673

[22] Filed: Nov. 27, 1995

[51] Int. Cl.$^6$ .............................. G06K 9/36; G06K 9/32; G06K 9/54; G06K 9/00

[52] U.S. Cl. .................. 382/276; 382/294; 382/305; 364/715; 395/501; 395/513; 395/524; 395/525; 395/615; 395/855

[58] Field of Search ............................. 382/276, 294, 382/305; 395/501, 513, 524, 525, 613, 855; 364/715

[56] References Cited

U.S. PATENT DOCUMENTS

| | | | |
|---|---|---|---|
| 4,839,801 | 6/1989 | Nicely et al. | 395/855 |
| 4,933,878 | 6/1990 | Guttag et al. | 395/524 |
| 5,204,958 | 4/1993 | Cheng et al. | 395/613 |
| 5,487,022 | 1/1996 | Simpson et al. | 364/715.04 |

*Primary Examiner*—Leo H. Boudreau
*Assistant Examiner*—Daniel G. Mariam
*Attorney, Agent, or Firm*—Beyer & Weaver, LLP

[57] ABSTRACT

In a processor, a method for performing table-lookup transformation through a look-up table a source image having a plurality of source pixels to derive a destination image having a plurality of destination pixels. The method includes the step of deriving, for each value in a source pixel of the plurality of source pixels, a look-up result. The aforementioned look-up result represents a value in a corresponding destination pixel of the plurality of destination pixels. The method further includes the steps of loading a plurality of the look-up results into a plurality of graphics registers in the processor and accumulating the plurality of the look-up results in the plurality of graphics registers into an accumulation register in the processor. Additionally, there is also provided the step of storing the accumulation register into the destination image.

19 Claims, 9 Drawing Sheets

METHODS AND APPARATUS FOR TABLE LOOKUP TRANSFORMATION OF DIGITAL IMAGES

BACKGROUND OF THE INVENTION

The present invention relates to image processing techniques. More particularly, the invention relates to improved methods and apparatus for performing table lookup transformation of digital images using a digital processor.

Table lookup is a useful image processing technique for mapping a source image into a destination image. In table lookup transformation, the source pixel values of a source image are processed through a lookup table to derive corresponding pixel values in a destination image. By way of example, a source image can be processed via a table lookup to derive a destination image that is darker. As another example, if the values of the pixels in the source image represent pressure, these pixel values can be mapped via a lookup table into color intensity values for display on a computer display screen.

FIG. 1 illustrates a simple table lookup procedure for transforming a source image into a destination image. A source image 102, representing an image stored in the computer's memory, is processed through a lookup table 104 to derive a destination image 106. For ease of illustration, source image 102 is a simple 6×6 image, i.e., it comprises 36 discrete source pixels, although a source image of any size may be transformed via the table lookup procedure.

In this example, each source pixel 108 contains a single value, which may represent, for example, the gray scale level of that pixel when rendered on a computer display screen. By way of example, source pixel 108 of FIG. 1 is shown to contain the value 57. In the example of FIG. 1, because there is only one value per pixel in source image 102, source image 102 is said to be a 1-banded image. However, a pixel may be represented by more than one value (e.g., 3 values for the red, green, and blue colors of a color pixel). Each value contained in source pixel 108 is represented in the computer memory by 8 bits, making source image 102 an 8-bit image. Other images may represent their pixels by a fewer or greater number of bits, e.g., 16 bits, to allow for a different range of values.

Table 104 preferably includes $2^n$ entries where n represents the number of bits used to represent each value in source pixel 108. Since 8 bits are used in the example of FIG. 1, table 104 therefore has $2^8$ or 256 entries. To perform table lookup transformation, the value in each source pixel 108 of source image 102 is passed through table 104 to derive a corresponding value for that pixel in destination image 106, e.g., destination pixel 110.

In the example of FIG. 1, the value contained in source pixel 108 is used as an index into table 104. By way of example, the value 57 in source pixel 108 causes the table lookup procedure to look into the 57th entry of table 104 in order to find the corresponding value for destination pixel 110. That value is, for illustration purposes, 15 in FIG. 1.

There is no requirement that both source pixel 108 and destination pixel 110 have to be represented by the exact same number of bits. In fact, it is conventional in certain cases to, for example, transform an 8-bit source pixel into a 16-bit destination pixel or vice versa.

FIG. 2 illustrates a table lookup transformation procedure for a multi-banded source image, i.e., a source image whose pixels contain more than one value. For illustration purposes, each source pixel 208 in source image 202 contains three values, or three bands, 212, 214, and 216. Table 204 now is a 3-banded table, i.e., it has three bands. As shown in FIG. 2, table 222 represents band 1 of table 204; table 224 represents band 2 of table 204; and table 226 represents band 3 of table 204. Assuming each band value in source pixel 208 is represented by eight bits of data, each of tables 222, 224, and 226 therefore has $2^8$ or 256 entries.

To perform the lookup, each band of source pixel 208 is processed through its associated band of table 204 in order to derive the corresponding band value in destination pixel 210. For example, value 52 in band 212 of source pixel 208 is processed by associated band 1 of the table, i.e., table 222, to derive a value 73 to be stored in band 240 of destination pixel 210. Likewise, value 14 in band 242 of destination pixel 210 is derived through band 2 of table 204, i.e., table 224, from the value 60 in band 214 of source pixel 208.

Similar to the example of FIG. 1, the integer value in each band of source pixel 208 is used as the index number into the corresponding band of the table. Note that it is possible in some embodiments for source pixel 208 and destination pixel 210 to have different numbers of bands. For example, source pixel 208 may have three bands while destination pixel may have, for example, five bands.

FIG. 3 shows in more detail the table lookup procedure of FIG. 1. In FIG. 3, the source pixel values are loaded into an integer register 302. The values stored into the integer register 302 are then used to select the values from the lookup table and to load them into an integer register 304. Thereafter, the values in integer register will be stored into destination image 106.

To improve efficiency, more than one source pixel values may be loaded into integer register 302. These values will be extracted from integer register using logical operations of a conventional nature. More than one value selected from lookup table 104 may be accumulated in integer register 304 before being stored into destination image 106.

To further illustrate, FIG. 4 is a flow chart illustrating the prior art table lookup procedure. FIG. 4 starts at step 350. In step 352, the method ascertains whether there are any additional source data, i.e., pixel or band value in the source image, to be processed through the lookup table, e.g., lookup table 104 of FIG. 3. If there is none, the method proceeds to step 354 where the steps of FIG. 4 end.

On the other hand, if there is additional source data to be processed, the method proceeds to step 356 wherein the source data is loaded into an integer register, e.g., register 302 of FIG. 3. Typically, the pixels are loaded one at a time. If the pixel has more than one band, e.g., three bands as in the case of FIG. 2, all the band values may be loaded together into the integer register in step 356. However, as mentioned earlier, more than one pixel may be loaded into the integer register at once to improve processing efficiency. For example, if the source image is an 8-bit, 1-banded source image (as in the cases of FIGS. 1 and 3), up to four pixel values may be loaded into the integer register at once in step 356.

In step 358, logical operations are employed to separate the pixel/band values that are loaded together in step 356. As the term is used herein pixel/band value denotes either the pixel value if the pixel has only one band or the individual band value if the pixel has more than one band. By way of example, if four pixel values are loaded at once into the integer register in step 356, shifting and "AND" operations are performed in order to separate the pixel values for the subsequent table look up. Such logical operations are familiar to those skilled in the art.

For each source pixel/band value, the corresponding destination value is obtained from the lookup table. The lookup results are then stored into one or more integer registers in step 360. In step 362, the prior art may employ logical operations such as shifting and "OR" to accumulate as many lookup results in the multiple integer registers of step 360 into an accumulation integer register, e.g., integer register 304 of FIG. 3, as possible. The accumulation of multiple lookup results into a single accumulation integer register reduces the number of store operations that is performed in a subsequent step 364 of the table.

In step 364, these integer registers are written into the corresponding positions in the destination image. Thereafter, the method returns to step 352 to check whether there is any more source data to process.

As is known to those skilled in the art, the loading and storing operations (performed in steps 362 and 364 respectively) typically represent one of the more time-consuming steps of the table lookup transform operation. It is recognized, therefore, that if these steps can be optimized, the lookup transformation that results can be made more efficient. Efficiency is improved by accumulating the lookup values from the lookup table into a register before storing them into the destination image.

In the prior art, integer registers are used in the post-lookup steps (e.g., steps 362 and 364 of FIG. 4) to accumulate the lookup results. The use of integer registers in the post-lookup steps reduces the overall throughput of the table lookup operation because the integer circuitry is, in some processors, slower than other circuits, e.g., the floating point circuitry.

In view of the foregoing, what is desired is improved methods and apparatus for optimizing the table lookup procedure. The improved methods and apparatus preferably improves efficiency by taking advantage of faster circuitries in the processor.

SUMMARY OF THE INVENTION

The invention relates, in one embodiment, to a method in a processor for performing table-lookup transformation through a look-up table a source image having a plurality of source pixels to derive a destination image having a plurality of destination pixels. The method includes the step of deriving, for each value in a source pixel of the plurality of source pixels, a look-up result. The aforementioned look-up result represents a value in a corresponding destination pixel of the plurality of destination pixels. The method further includes the steps of loading a plurality of the look-up results into a plurality of graphics registers in the processor and accumulating the plurality of the look-up results in the plurality of graphics registers into an accumulation register in the processor. Additionally, there is also provided the step of storing the accumulation register into the destination image.

In another embodiment, the invention relates to computer readable medium containing program instructions for performing table-lookup transformation. The table-lookup transformation is performed through a look-up table on a source image having a plurality of source pixels to derive a destination image having a plurality of destination pixels. The instructions include instructions for deriving, for each value in a source pixel of the plurality of source pixels, a look-up result, the look-up result representing a value in a corresponding destination pixel of the plurality of destination pixels. Further, there are provided instructions for loading a plurality of the look-up results into a plurality of graphics registers in the processor and accumulating the plurality of the look-up results in the plurality of graphics registers into an accumulation register in the processor. Still further, there are instructions for storing the accumulation register into the destination image.

DETAILED DESCRIPTION OF THE PREFERRED EMBODIMENTS

Figure 1:
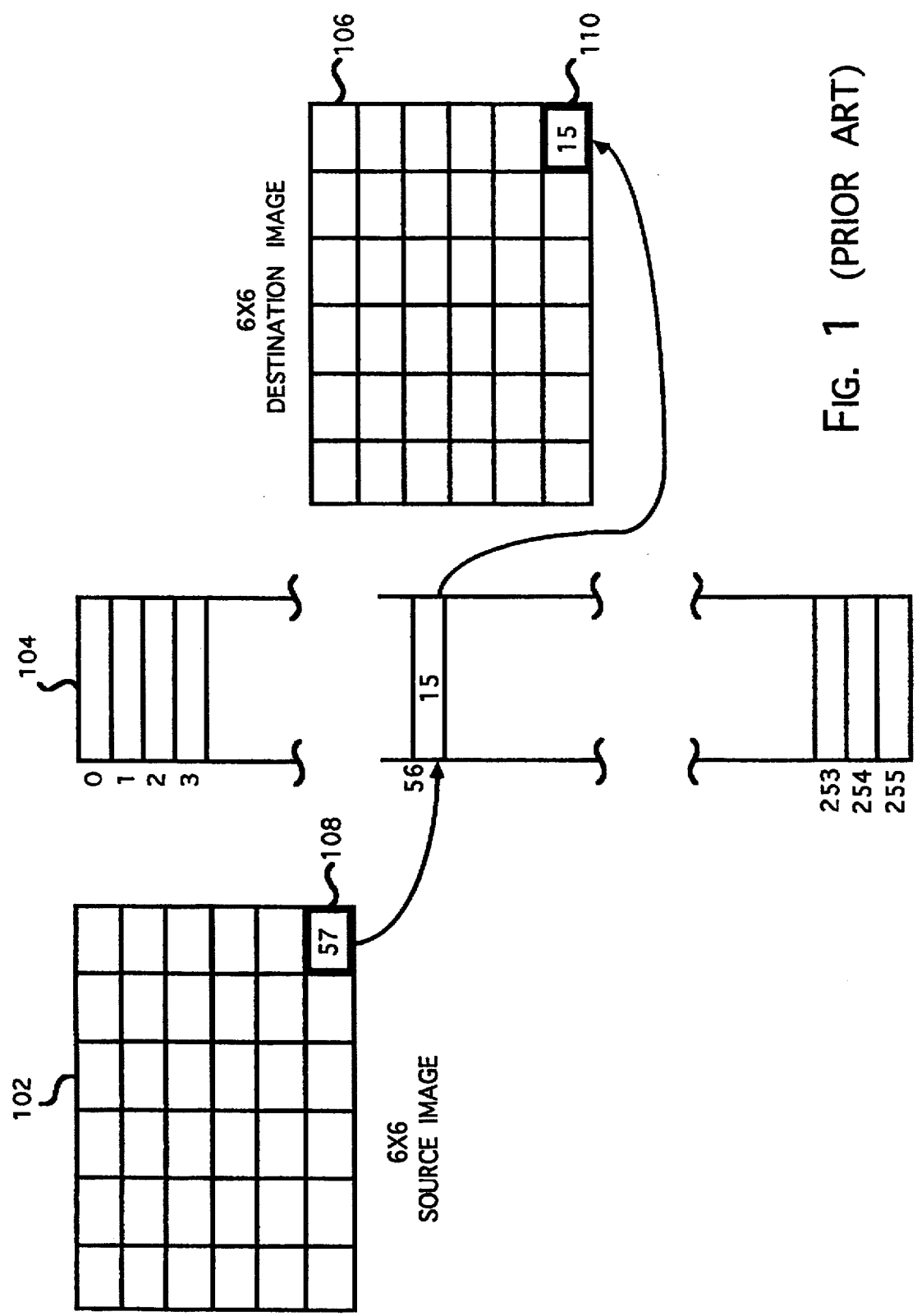
FIG. 1 illustrates a simple table lookup procedure for transforming a source image into a destination image.
Figure 2:
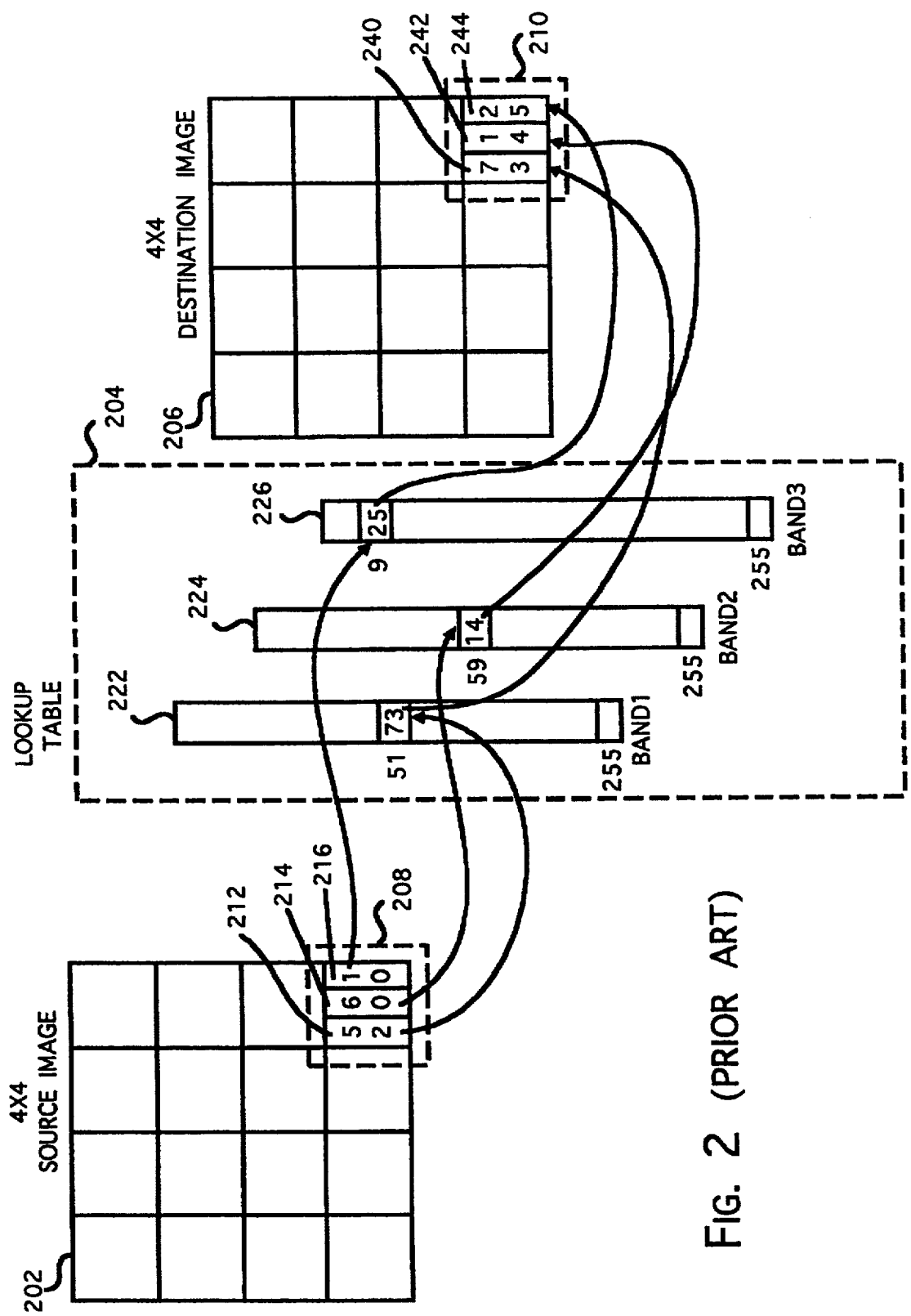
FIG. 2 illustrates a table lookup procedure for a multi-banded source image, i.e., a source image whose pixels contain more than one value.
Figure 3:
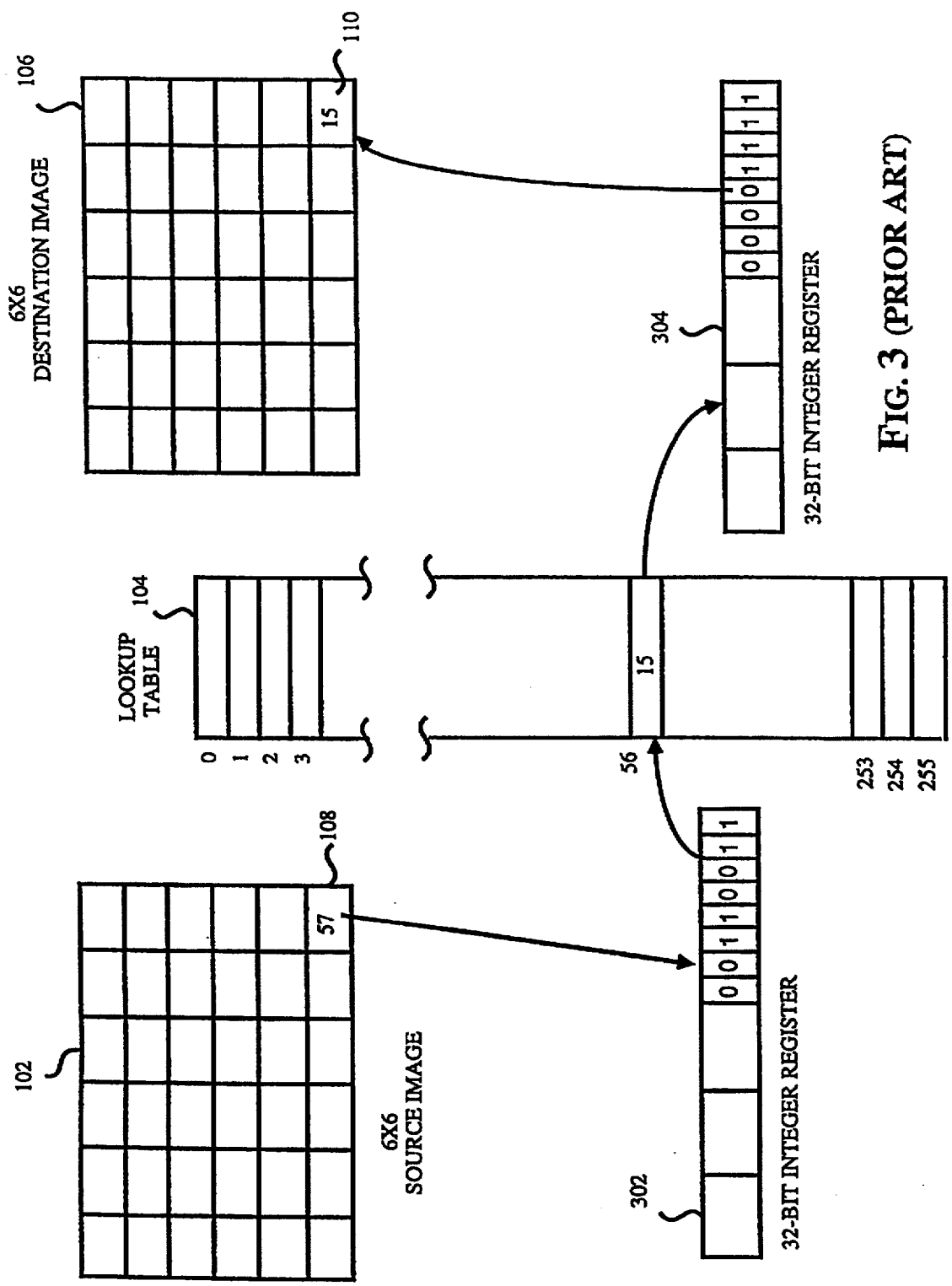
FIG. 3 illustrates in greater detail the lookup procedure for the source image of FIG. 1.
Figure 4:
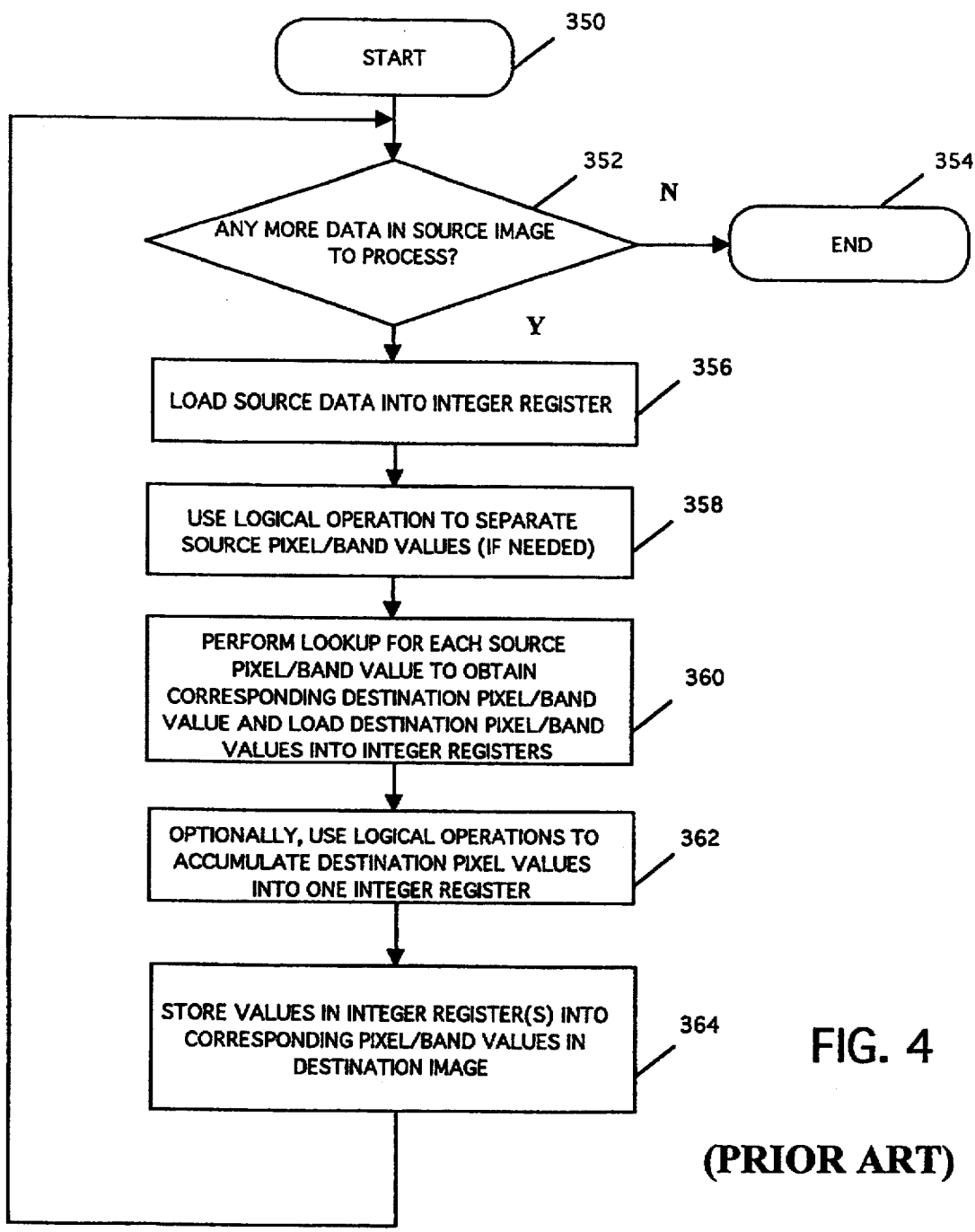
FIG. 4 is a flow chart illustrating the prior art table lookup procedure.

FIG. 1 illustrates a simple table lookup procedure for transforming a source image into a destination image. FIG. 2 illustrates a table lookup procedure for a multi-banded source image, i.e., a source image whose pixels contain more than one value. FIG. 3 illustrates in greater detail the lookup procedure for the source image of FIG. 1. FIG. 4 is a flow chart illustrating the prior art table lookup procedure.

Figure 5:
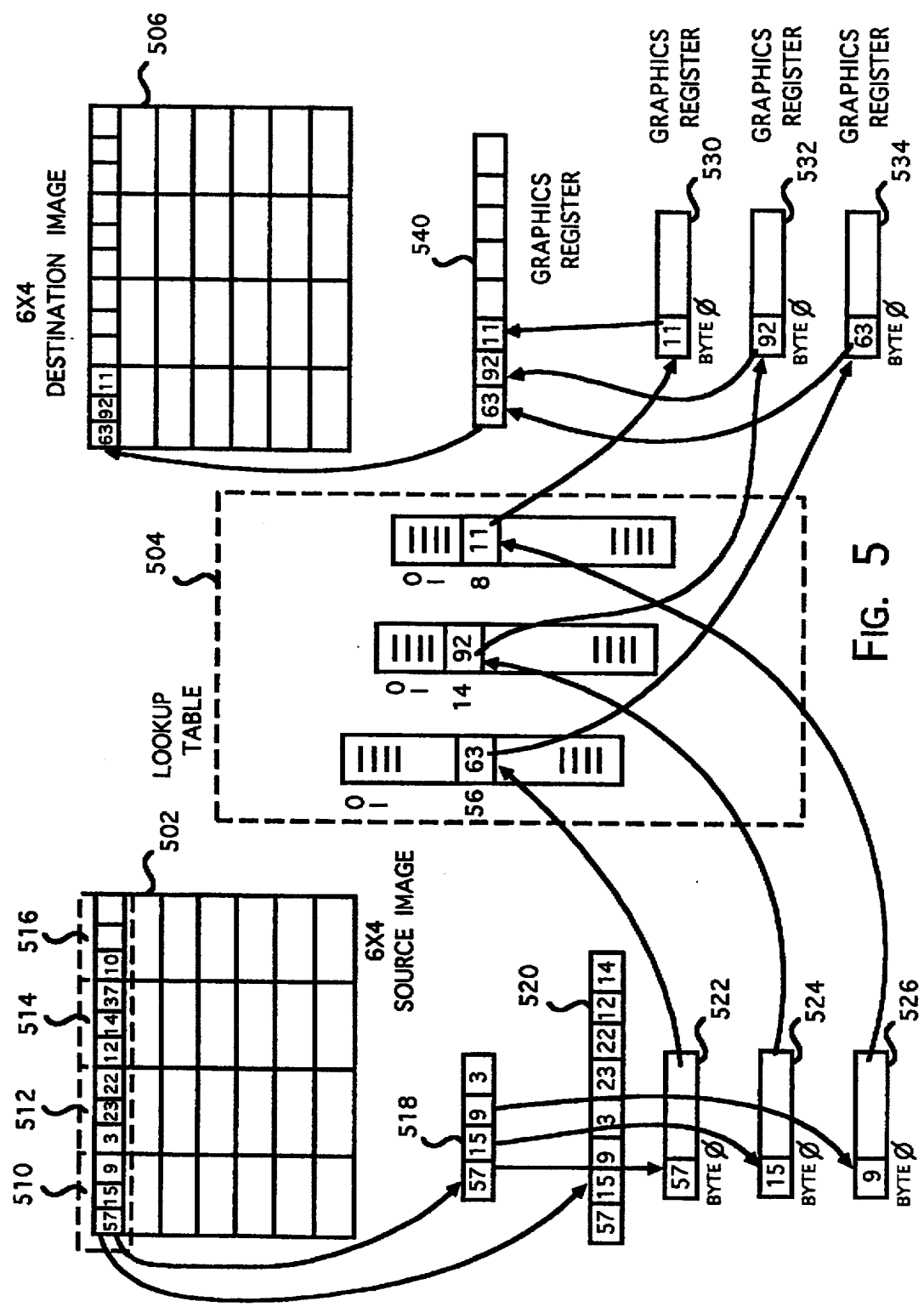
FIG. 5 schematically illustrates the table lookup technique in accordance with one embodiment of the present invention.

FIG. 5 schematically illustrates the table lookup operation in accordance with one embodiment of the present invention. Referring now to FIG. 5, there is shown a source image 502. The pixel values in source image 502 are processed via a lookup table 504 to derive a destination image 506. To ease illustration, source image 502 is a simple 6×4 image (i.e., 24 pixels), as is destination image 506. However, the method applies equally well for source and destination images of any size.

Within source image 502, shown are source pixels 510, 512, 514, and 516. Each source pixel in source image 502 has three bands; each band is in turn represented by eight bits of data (i.e., source image 502 is an 8-bit, 3-banded image). As many band values in source image 502 are preferably loaded into an integer register as possible to minimize the number of loading operations. In one embodiment, up to 4 band values (8 bits×4 or 32 bits) are loaded into a 32-bit integer register 518. In another embodiment, up to eight band values from source image 502 are loaded at once into 64-bit long integer register 520. If the processor supports even longer integer registers, these band values in source image 502 may be loaded into those longer integer registers.

During the loading of the source pixels, the source pixels are typically loaded row by row. However, the invention works equally well with other methods of loading the source image (e.g., column by column).

As mentioned earlier, however, the integer register is preferably filled up with source data during each load operation to minimize the total number of load operations that is performed. If a given load operation loads only a portion of a pixel (e.g., only 2 bands out of 3), the remaining portion may be loaded in the next load cycle or the entire pixel may be reloaded.

For example, although each source pixel of source image 502 contains only three band values, the loading operation loads four band values to fill up 32-bit integer register 518. These values are shown in FIG. 5 as values 57, 15, 9, and 3, representing pixel 510 and one band of adjacent pixel 512. The next load operation could start from value 23 in source pixel 512, in which case the value 3 loaded into 32-bit integer register 518 in the previous load could be temporarily saved in some variable so it does not have to be loaded again. Alternatively, loading may begin with band 1 of the next pixel, e.g., loading the value 3 again in the next load operation.

Whether the band values of source image 502 are loaded into 32-bit integer register 518, 64-bit long integer register 520, or even longer integer registers, the band values therein are processed via logical operations to separate out the pixel/band values. For example, the values 57, 15, and 9 in long integer register 520 are shifted and "ANDed" with an appropriate bit pattern in order to separate out those values into integer registers 522, 524, and 526. As mentioned earlier, the logical operations involved in separating these pixel/band values are familiar to those skilled in the art.

The band values in integer registers 522, 524, and 526 are then processed via lookup table 504 (through the appropriate band of the table) to derive the lookup results. The lookup results are then loaded into double registers 530, 532, and 534. Note that although double registers are explicitly specified herein as the registers for storing the lookup results and for accumulating them, float registers may well be employed if appropriate. Consequently, float and double may be interchangeably used in the invention since the double registers and the float registers overlap in some processors, e.g., the aforementioned UltraSparc™ processor. As mentioned previously, the ability to utilize the faster circuitry, e.g., the floating point circuitry in this case, in the post-lookup steps represents one major advantage of the present invention.

It should be noted that the loading of the lookup results from lookup table 504 into double registers 530, 532, and 534 may involve, in some cases, the loading of less than 32 bits (in the case of the example of FIG. 5, 8-bit look-up results) into 32-bit float registers. As will be discussed in detail later, the present invention advantageously employs a short load procedure to facilitate the loading of any byte or short (2 bytes) into a 32-bit float register, a 64-bit double register, or even longer registers.

In one embodiment, the short load instructions furnished by the Visual Instruction Set (VIS™), the set of specialized graphics commands used to optimize application throughput, manufactured by the aforementioned Sun Microsystems, Inc., is utilized to perform this short load procedure. The UltraSparc™ processor and relevant instructions in the VIS™ instruction set are described briefly herein and more completely in U.S. patent application Ser. No. 08/236,572 by Timothy J. Van Hook, Leslie Dean Kohn, and Robert Yung, filed Apr. 29, 1994 entitled "A Central Processing Unit with Integrated Graphics Functions"(the '572 application), and *The SPARC Architecture Manual, Version 9*, (1994) available from SPARC International, Inc. of Menlo Park, Calif., which are both incorporated by reference herein.

From double registers 530, 532, and 534, the lookup results are then accumulated into a 64-bit double register 540. Once the lookup results are accumulated in 64-bit double register 540, a load operation is performed to store the lookup results into the corresponding pixel/band values in destination image 506. The destination image may reside in the computer memory, the frame buffer, or the like. Here again, these accumulation and storing processes take advantage of the faster floating point circuitry on the processor to minimize processing time.

Optionally, as many load and lookup operations as needed to fill up 64-bit double register 540 are performed before a store operation into destination image 506 is performed. Note that the present invention provides for an accumulation register, e.g., 64-bit double register 540, that is potentially greater in capacity than the integer register into which the source pixel values are read, e.g., 32-bit integer register 518. The fact that the present inventive embodiment provides for multiple load and lookup operations per one 64-bit register store operation means that fewer store operations than the prior art are required in performing the table lookup transformation of source image 502.

Furthermore, double register 540 has a substantially greater capacity than the 32-bit integer accumulation register, e.g., integer register 304 of FIG. 3, that is employed in the prior art. Therefore, the total number of store operations that is performed in storing the lookup results into the destination image is advantageously reduced.

In the present invention, registers 530, 532, and 534 as well as accumulation register 540 are employed to store bit patterns, not floating point values. In other words, the present invention advantageously utilizes the float and double registers as if they are graphic registers. Note that in the UltraSparC™ embodiment, the graphics registers are implemented by the float/double registers. In other systems, however, other 32-bit, 64-bit, or even larger capacity registers, may well be employed to minimize the number of store operations that is performed. More importantly, greater efficiency is further achieved if those registers reside in a portion of the processor that is faster than the integer portion, i.e., the portion employed by the prior art to load and accumulate the lookup results.

As mentioned earlier, accumulation of lookup results requires, in principle, the use of logical operations, e.g., shifting and ORing, to put together lookup results from the multiple float/double registers into a single accumulation float/double register. In accordance with one particularly advantageous embodiment of the present invention, a register data extraction and arrangement (RDEA) procedure is employed to emulate the logical operations. Another aspect of this embodiment involves the use of instructions in the VIS™ instruction set, such as Alignaddr, Faligndata, and Fpmerge, to implement the register data extraction and arrangement (RDEA) procedure.

Figure 6:
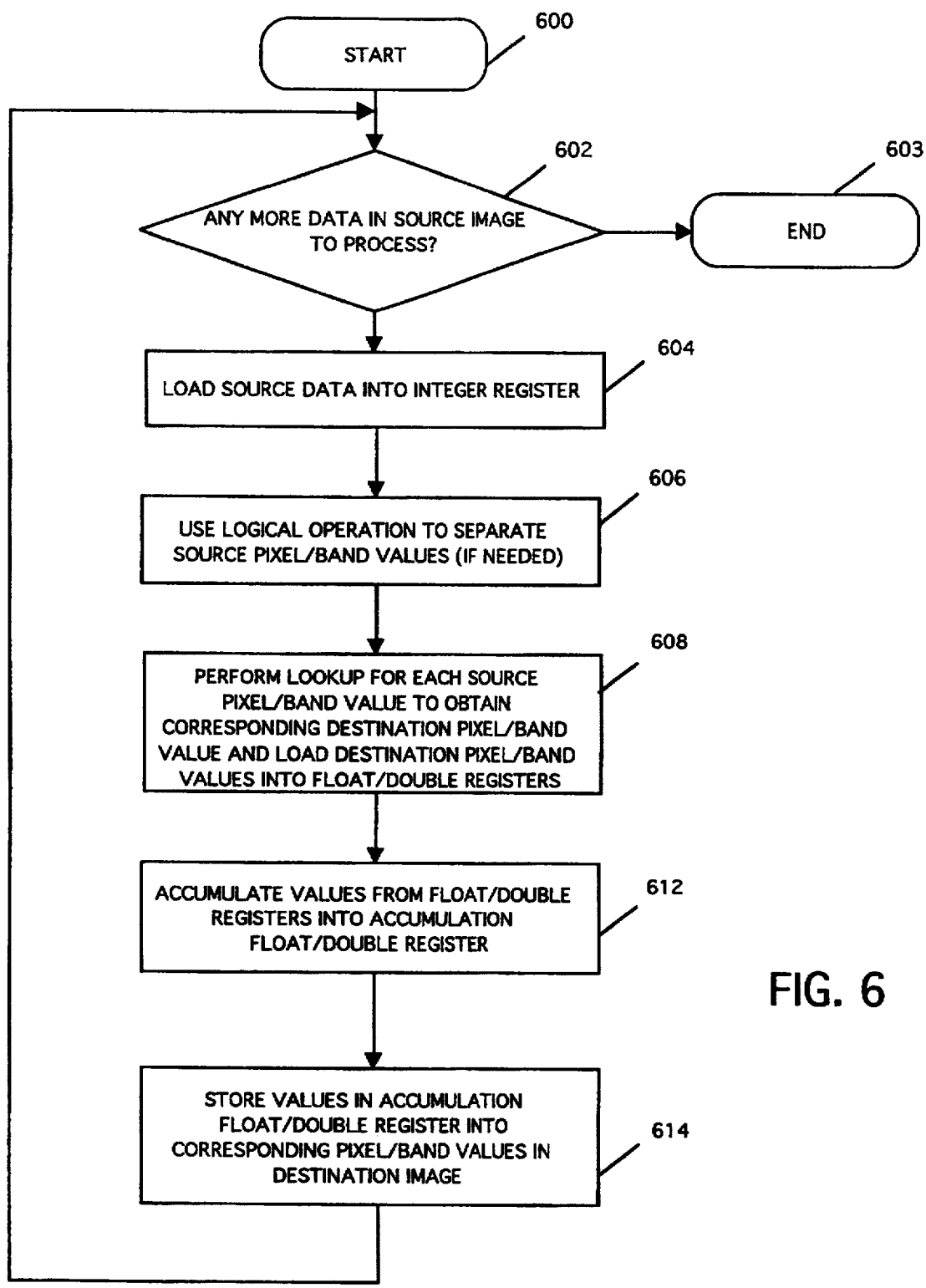
FIG. 6 is a flowchart illustrating the steps involved in performing table lookup transformation in accordance with one embodiment of the present invention.

FIG. 6 is a flowchart illustrating the steps involved in performing table lookup transformation in accordance with one embodiment of the present invention. FIG. 6 starts at steps 600. In step 602, the method checks to see whether there is any more source data to process. If not, the method proceeds to step 604 wherein the steps of FIG. 6 end. On the other hand, if there is still source data to process via the table lookup operation, the method proceeds to step 604 wherein the source data is loaded into an integer register. As mentioned in FIG. 5, the integer register that is used to load the source pixel values is preferably a large integer register (the larger the better to minimize the number of load operations). Further, it is preferable that the integer register of step 604 be filled with as many source pixel values as possible during a load operation.

From step 604, the method conventional step 606 wherein logical operations of a conventional nature, e.g., shifting and "ANDing," are employed to separate the pixel/band values so that they can be loaded into separate integer registers to facilitate the actual lookup via the lookup table. If the source pixel has multiple bands, the band values are separated in step 606.

In step 608, the pixel/band values ascertained in step 606 are used to look up the corresponding value from the corresponding band of the table. With reference to FIG. 5, the band values in integer registers 522, 524, and 526 are transformed into corresponding values 63, 92, and 11 from the appropriate band of lookup table 504.

In step 608, the lookup results are loaded into the float/ double or even larger registers. By way of example, the programmer typically specifies in step 608, using C, C++ or other programming languages, that the lookup results should be loaded into float/double variables. The loading of the lookup results into the float/double registers will then be specified by the compiler. The loading of lookup results into float/double registers in step 608 is a major advantage of the present invention because in some processors, e.g., the aforementioned UltraSparc™ processor, the floating point circuitry is much faster than the integer circuitry.

In step 612, the values loaded into the float/double registers (in step 608) are then accumulated into an accumulation float/double register (or even a larger register if such a register is sufficiently fast and is supported by the processor) to facilitate the storing into the destination image. In one embodiment, 64-bit double registers are used in step 612. As mentioned earlier, the method optionally performs as many load operations (step 604) and lookup operations (step 606, 608, and 610), as necessary to fill up the accumulation register in step 612.

The values in the accumulation registers, e.g., the float/ double registers, are stored into the destination image in step 614. In one embodiment, the inventive method keeps track of how many bits it needs to load in order to fill up a float/double accumulation register for storage. If the load/ lookup operations yield extra bits after the accumulation float/double register is filled up, the extra leftover bits may be accumulated in another register to be stored in a subsequent store operation. These implementation details are conventional and readily understood by those skilled in the art given this disclosure. From step 614, the method returns to step 602 to ascertain again whether there is any more source date to process.

If the look-up results are represented by less than 32 bits, the invention provides, in one embodiment, a short load procedure to facilitate the loading of the short bit patterns (representing the lookup values from the lookup table) into the floating point or double registers.

In the case of multi-banded source images, the invention provides, in one embodiment, the ability to mask some of the bands. For example, the lookup of a 3-banded source image into a 3-banded destination image could be performed in such a way that the second band is masked off, i.e., the values in the second band of the destination image is not changed.

Figure 7A:
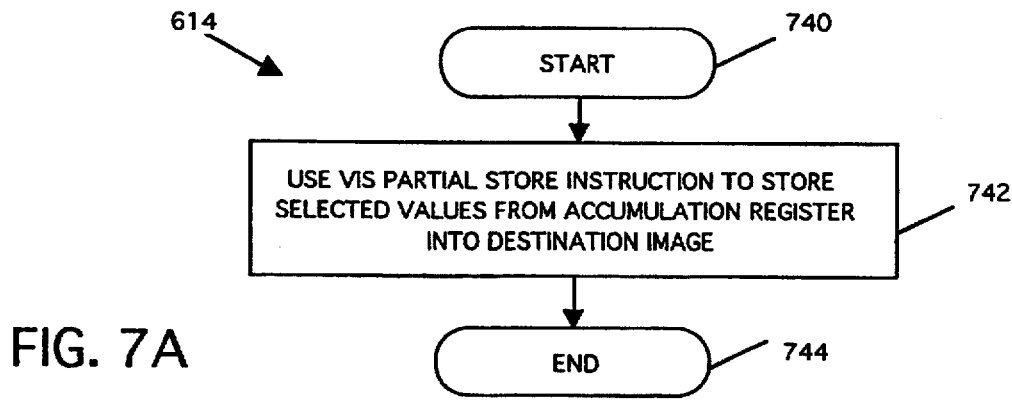
FIG. 7A is a simple flowchart illustrating, in one embodiment of the invention, the use of the VIS™ partial store procedure to store selected values from the accumulation register into the destination image.

This feature is achieved through the use of the partial store procedure. In one specific embodiment, the partial store procedure is implemented using the VIS™ partial store instructions (STDFA). The use of the VIS™ partial store instruction to implement step 614 of FIG. 6 is illustrated in FIG. 7A.

This class of instructions allow the specification of a mask value, which contains information regarding which bytes from the accumulation register are to be stored into the destination image. For further information regarding the VIS™ partial store instructions, reference may be made to, for example, Appendix A. Note that this procedure may also be employed in other situations as well, e.g., in the case when after most of a line of pixels in an image has been processed and there are a few remaining bytes or words to be stored in the destination image. In this case, the partial store procedure is used to store less than a full register of data into memory.

Figure 7B:
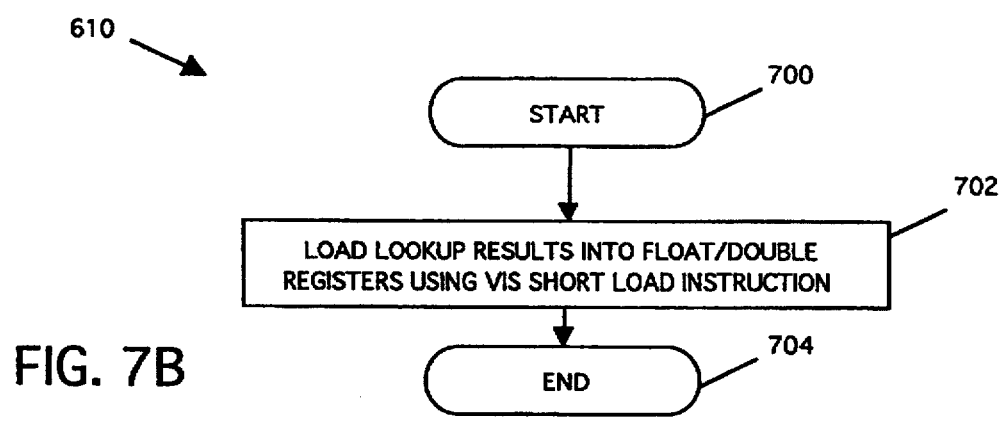
FIG. 7B is a simple flowchart illustrating, in one embodiment of the invention, the use of the VIS™ short load instruction for loading source data.

FIG. 7B illustrates a simple flowchart for implementing the loading step 610 of FIG. 6 in accordance with this embodiment. In FIG. 7B, the loading step 610 of FIG. 6 is shown in step 702 to further include the step of utilizing the short load procedure to facilitate look-up result loading into float/double registers.

The aforementioned short load procedure is implemented, in one embodiment, by the VIS™ short load instruction Idda. It should be borne in mind, however, that the use of VIS™ instructions is but one way to implement the short load procedure. Reference should be made to Appendix A for a more detailed explanation of the VIS™ short load instruction.

As is apparent to those skilled in the art, the VIS™ short load instruction of Appendix A may be used to, for example, specify that a different number of bits may be loaded (e.g., 16 bits) if the look-up table is 16-bit.

By using the VIS™ short load instruction, the byte of interest, i.e., the one to be loaded, can be misaligned in memory. For example, the byte of interest does not have to be double-aligned (divisible by 8) in memory. The use of the short load procedure allows any byte or word of interest to be directly loaded into the appropriate float/double register. In contrast, the prior art loads data starting from a double-aligned memory location and perform any necessary shifting and logical operations to isolate the data of interest prior to loading. Consequently, the loading operation is made even more efficient under the present invention.

In an analogous manner, the VIS™ instruction short store of Appendix A may be employed to store a byte or a word into a memory address that is not double-aligned. The use of such a short store instruction is particularly useful when there are bytes or words remaining to be stored into the destination image.

The float/double registers containing the look-up results values are accumulated into an accumulation register to reduce the number of store operations (step 612 of FIG. 6). In the prior art, this accumulation operation is performed by shifting and ORing multiple integer registers into a single integer register. The present invention also can, in one embodiment, accumulate by emulating the shifting and ORing, albeit using the faster floating point circuitry and the float/double registers. The invention advantageously employs align procedures to emulate shifting and ORing operations in accumulating multiple float/double registers into a single accumulation float/double register.

In a particularly advantageous embodiment, the VIS™ alignaddr and faligndata instructions are used to implement the aforementioned register data extraction and rearrangement procedure. An exemplary VIS-related register data extraction and rearrangement procedure is to 1) use the VIS alignaddr instruction to specify an offset, and 2) use the VIS faligndata instruction to concatenate two float/double register and to extract the resulting float/double register from the concatenated string starting from the specified offset.

Figure 8:
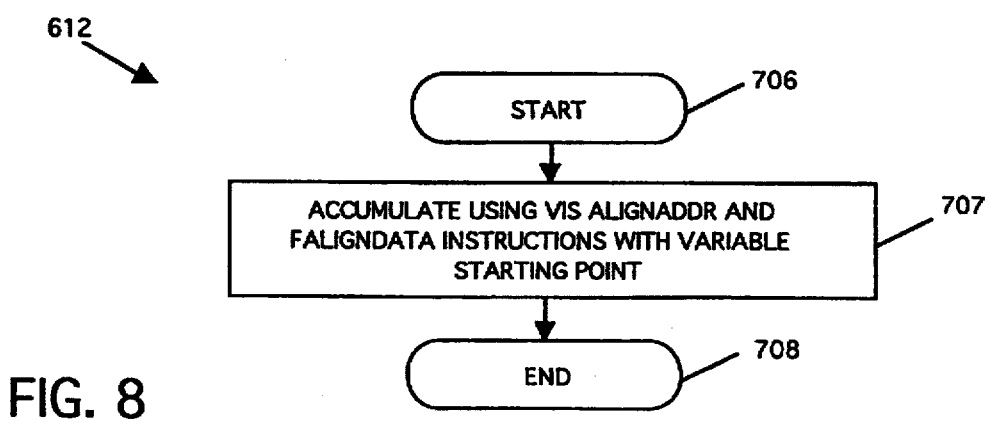
FIG. 8 is a flowchart illustrating, in one embodiment of the invention, the steps involved in accumulating lookup results employing the VIS™ alignaddr and faligndata instructions using variable starting points.

In the embodiment of FIG. 8 and as illustrated below, the alignaddr and faligndata instructions are used with a variable starting point, i.e., the starting point in the concatenated string from which the resulting data bit pattern in obtained changes depending the double register involved.

EXAMPLE 1
Use of alignaddr and faligndata with variable starting points

Assume a 3-banded source pixel, each band represented by 8 bits. The pixels band values are stored contiguously in memory. In the examples below, the character * denotes the "don't care" bytes.

```
vis_alignaddr (5, 0)                    // cutoff will start at 6th byte from the left
double_3 = vis_faligndata (double_1, double_2);
    double_1:        ****    *xyz
    double_2:        ****    ****
    concatenate:     ****    *xyz    ****    ****
    double_3:        xyz*    ****                // (data to be stored)
vis_alignaddr (2, 0)                    // cutoff will start at 3rd byte from the left
double_6 = vis_faligndata (double_4, double_5);
    double_4:        ****    *abc
    double_5:        ****    ****
    concatenate:     ****    *abc    ****    ****
    double_6:        ***a    bc**                // (data to be stored)
vis_alignaddr (7, 0);                   // cutoff will start at 8th byte from the left
double_9 = vis_faligndata (double_7, double_8);
    double_7:        ****    ****
    double_8:        ****    *mnp
    concatenate:     ****    ****    ****    *mnp
    double_9:        ****    *mn                 // (data to be stored)
```

The double registers double_3, double_6 and double_9 may be ORed together into another double register before being written into the destination image.

Figure 9:
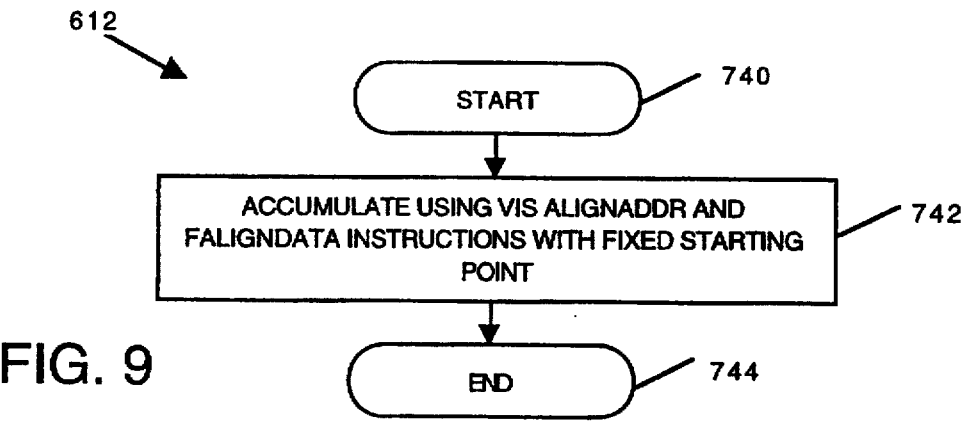
FIG. 9 is a flowchart illustrating, in one embodiment of the invention, the steps involved in accumulating lookup results employing the VIS™ alignaddr and faligndata instructions using a fixed starting point.

Alternatively, the aforementioned VIS™ instructions alignaddr and faligndata may be used with a fixed starting point, i.e., the starting point in the concatenated string from which the resulting data bit pattern in obtained is fixed. This alternative embodiment is illustrated in FIG. 9 and discussed below.

EXAMPLE 2
Use of alignaddr and faligndata with fixed starting point

Assume 1-banded source image, each band represented by 8 bits. The pixels band values are stored contiguously in memory. Eight 8-bit values, representing 8 destination pixels are obtained from the look-up table and loaded into 8 double registers db1, db2, db3, db4, db5, db6, db7, and db8.

```
db1:                 ****    ***a
db2:                 ****    ***b
db3:                 ****    ***c
db4:                 ****    ***d
db5:                 ****    ***e
db6:                 ****    ***f
db7:                 ****    ***g
db8:                 ****    ***h
double_accumulator:  ****    ****
```

The following instructions accumulate the above eight 8-bit values from double registers db1–db8 into an accumulation double register double_accumulator to be stored in the proper location in memory.

```
vis_alignaddr (7, 0);
double_accumulator = vis_faligndata (db8, double_accumulator);
```

The effect of this is:

```
concatenate:         ****    ***h    ****    ****
double_accumulator:                  h***    ****
double_accumulator = vis_faligndata (db7, double_accumulator);
```

The effect of this is:

```
concatenate:         **    *g    h*    **
double_accumulator:                  gh**    ****
double_accumulator = vis_faligndata (db6, double_accumulator);
```

The effect of this is:

```
concatenate:         ****    ***f    ****    ****
double_accumulator:                  fgh*    ****
double_accumulator = vis_faligndata (db5, double_accumulator);
```

The effect of this is:

```
concatenate:         ****  ***e  ****  ****
double_accumulator:              efgh  ****
double_accumulator = vis_faligndata (db4, double_accumulator);
```

The effect of this is:

```
concatenate:         ****  ***d  ****  ****
double_accumulator:              defg  h***
double_accumulator = vis_faligndata (db3, double_accumulator),
```

The effect of this is:

```
concatenate:         *** ***c  **** ****
double_accumulator:           cdef gh**
```

The effect of this is:

```
concatenate:         *** ***b  **** ****
double_accumulator:           bcde fgh*
```

The effect of this is:

```
concatenate:         *** ***a  **** ****
double_accumulator:           abcd efgh
```

The double register double_accumulator may now be stored into memory.

In accordance with yet another embodiment of the present invention, the accumulation step 612 of FIG. 6 may also be implemented using a merge procedure. In accordance with the merge procedure, two float/double registers are merged together in an interleaved manner into another float/double register. By taking advantage of the merge procedure, multiple float/double registers may be accumulated into an accumulation register for storage.

Figure 10:
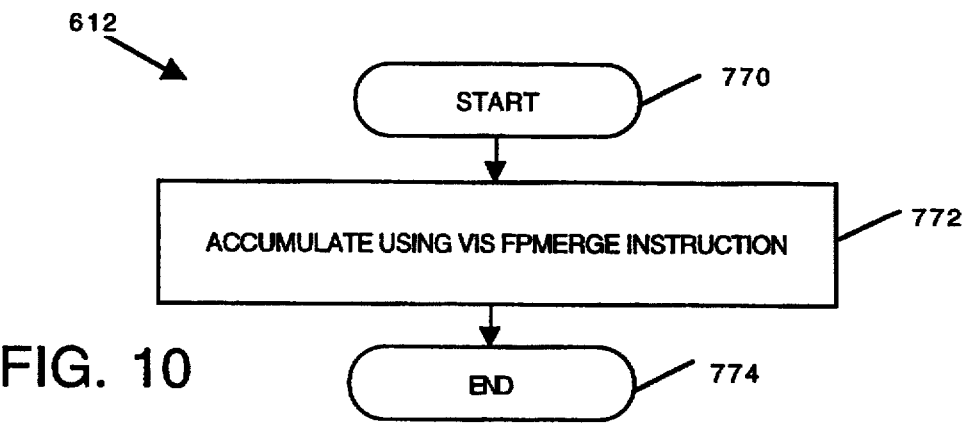
FIG. 10 is a flowchart illustrating, in one embodiment of the invention, the steps involved in accumulating lookup results employing the VIS™ fpmerge instruction.

FIG. 10 illustrates, in one embodiment of the present invention, the merge procedure utilizing the VIS™ fpmerge instruction. Two double registers % f4 and % f8 are merged such that their data are interleaved in the resulting double register % f0.

In the embodiment of FIG. 10 and as illustrated below, the VIS™ fpmerge instruction is employed to achieve accumulation of multiple float/double registers into a single accumulation float/double register for storage.

EXAMPLE 3

Usage of fpmerge to accumulate look-up results for storing into the destination image Assume a 1-banded source image, each band represented by 8 bits. The pixel band values are stored contiguously in memory In this example, eight 8-bit look-up results are obtained from the look-up table and loaded into 8 double registers db1, db2, db3, db4, db5, db6, db7, db8.

```
db1:                 **** ***a
db2:                 **** ***b
db3:                 **** ***c
db4:                 **** ***d
db5:                 **** ***e
db6:                 **** ***f
db7:                 **** ***g
db8:                 **** ***h
double_accumulator:  **** ****
```

The following instructions accumulate the eight 8-bit look-up results into the double register double_accumulator:

```
db15 = vis_fpmerge(db1, db5);
db15:                **** **ae
db37 = vis_fpmerge(db3, db7);
db37:                **** **cg
db26 = vis_fpmerge(db2, db6);
db26:                **** **bf
db48 = vis_fpmerge(db4, db8);
db48:                **** **dh
db1357 = vis_fpmerge(db15, db37);
db1357:              **** **aceg
db2468 = vis_fpmerge(db26, db48);
db2468:              **** **bdfh
double_accumulator = vis_fpmerge(db1357, db2468);
double_accumulator:  abcd efgh
```

The double register double_accumulator may now be stored into the destination image in memory.

While this invention has been described in terms of several preferred embodiments, there are alterations, permutations, and equivalents which fall within the scope of this invention. It should also be noted that there are may alternative ways of implementing the methods and apparatuses of the present invention. It is therefore intended that the following appended claims be interpreted as including all such alterations, permutations, and equivalents as fall within the true spirit and scope of the present invention.

APPENDIX A

PARTIAL STORE INSTRUCTIONS

| Opcode | imm_asi | ASI Value | Operation |
|---|---|---|---|
| STDFA | ASI_PST8_P | 0xc0 | Eight 8-bit conditional stores to primary address space |
| STDFA | ASI_PST8_S | 0xc1 | Eight 8-bit conditional stores to secondary address space |
| STDFA | ASI_PST8_PL | 0xc8 | Eight 8-bit conditional stores to primary address space, little-endian |
| STDFA | ASI_PST8_SL | 0xc9 | Eight 8-bit conditional stores to secondary address space, little-endian |
| STDFA | ASI_PST16_P | 0xc2 | Four 16-bit conditional stores to primary address space |
| STDFA | ASI_PST16_S | 0xc3 | Four 16-bit conditional stores to secondary address space |
| STDFA | ASI_PST16_PL | 0xca | Four 16-bit conditional stores to primary address space, little-endian |
| STDFA | ASI_PST16_SL | 0xcb | Four 16-bit conditional stores to secondary address space, |

APPENDIX A-continued

| | | | |
|---|---|---|---|
| STDFA | ASI_PST32_P | 0xc4 | Two 32-bit conditional stores to primary address space |
| STDFA | ASI_PST32_S | 0xc5 | Two 32-bit conditional stores to secondary address space |
| STDFA | ASI_PST832_PL | 0xcc | Two 32-bit conditional stores to primary address space, little-endian |
| STDFA | ASI_PST32-SL | 0xcd | Two 32-bit conditional stores to secondary address space, little-endian |

Format (3):

| 11 | rd | 110111 | rs1 | i=0 | imm_asi | rs2 |
|---|---|---|---|---|---|---|
| 31 30 | 29   25 | 24   19 | 18   14 | 13 | 12    5 | 4    0 |

Suggested Assembly Language Syntax
stda  freg$_{rd}$, [reg$_{rs1}$]  reg$_{rs2}$, imm_asi Description:

The partial store instructions are selected by using one of the partial store ASIs with the STDA instruction.

Two 32-bit, four 16-bit or eight 8-bit values from the 64-bit rd register are conditionally stored at the address specified by rs1 using the mask specified by rs2. The value in rs2 has the same format as the result generated by the pixel compare instructions. The most significant bit of the mask (not the entire register) corresponds to the most significant part of the rs1 register. The data is stored in little-endian form in memory of the ASI name has a little suffix; otherwise, it is big-endian.

NOTE: If the byte ordering is little-endian, the byte enables generated by this instruction are swapped with respect to big-endian.

Traps:

fp_disabled
mem_address_not_aligned
data_access_exception
PA_watchpoint
VA_watchpoint
illegal_instruction (when i = 1, no immediate mode is supported. This is not checked if there is a data_access_exception for a non-STDFA opcode).

SHORT FLOATING-POINT LOAD AND STORE INSTRUCTIONS

| Opcode | imm_asi | ASI Value | Operation |
|---|---|---|---|
| LDDFA STDFA | ASI_FL8_P | 0xd0 | 8-bit load/store from/to primary address space |
| LDDFA STDFA | ASI_FL8_S | 0xd1 | 8-bit load/store from/to secondary address space |
| LDDFA STDFA | ASI_FL8_PL | 0xd8 | 8-bit load/store from/to primary address space, little-endian |
| LDDFA STDFA | ASI_FL8_SL | 0xd9 | 8-bit load/store from/to secondary address space, little-endian |
| LDDFA STDFA | ASI_FL16_P | 0xd2 | 16-bit load/store from/to primary address space |
| LDDFA STDFA | ASI_FL16_S | 0xd3 | 16-bit load/store from/to secondary address space |
| LDDFA STDFA | ASI_FL16_PL | 0xda | 16-bit load/store from/to primary address space, little-endian |
| LDDFA STDFA | ASI_FL16_SL | 0xdb | 16-bit load/store from/to secondary address space, little-endian |

Format (3): LDDFA

| 11 | rd | 110011 | rs1 | i=0 | imm_asi | rs2 |
|---|---|---|---|---|---|---|

| 11 | rd | 110011 | rs1 | i=1 | simm_13 |
|---|---|---|---|---|---|

31 30 29   25 24   19 18   14 13 12    5 4    0

Format (3): STDFA

| 11 | rd | 110111 | rs1 | i=0 | imm_asi | rs2 |
|---|---|---|---|---|---|---|

| 11 | rd | 110111 | rs1 | i=1 | simm_13 |
|---|---|---|---|---|---|

31 30 29   25 24   19 18   14 13 12    5 4    0

APPENDIX A-continued

Suggested Assembly Language Syntax

| | | |
|---|---|---|
| ldda | [reg_addr] imm_asi, freg$_{rd}$ | |
| ldda | [reg_plus_imm] %asi, freg$_{rd}$ | |
| stda | fregrd, [reg_addr] imm_asi | |
| stda | fregrd, [reg_plus_imm] %asi | |

Description:

Short floating-point load and store instructions are selected by using one of the short ASIs with the LDDA and STDA instructions.

These ASIs allow 8- and 16-bit loads or stores to be performed to the floating-point registers. Eight-bit loads can be performed to arbitrary byte addresses. For sixteen bit loads, the least significant bit of the address must be zero, or a mem_not_aligned trap is taken. Short loads are zero-extended to the full floating point register. Short stores access the low order 8 or 16 bits of the register.

Little-endian ASIs transfer data in little-endian format in memory; otherwise, memory is assumed to big-endian. Short loads and stores typically are used, with the FALIGNDATA instruction to assemble or store 64 bits of non-contiguous components.

TRAPS:

fp_disabled
    PA_watchpoint
    VA_watchpoint
    mem_address_not_aligned (Checked for opcode implied alignment if the opcode is not LDFA or STDFA)
    data_access_exception

FPMERGE

FPMERGE interleaves four corresponding 8-bit unsigned values in rs1 and rs2, to produce a 64-bit value in the rd register. This instruction converts from packed to planar representation when it is applied twice in succession; for example, R1G1B1A1, R3G3B3A3 -> R1R3G1G2B1B3 -> R1R2R3R4B1B2B3B4.

FPMERGE also converts from planar to packed when it is applied twice in succession; for example: R1R2R3R4, B1B2B3B4 -> R1B1R2B2R3B3R4B4 -> R1G1B1A1R2G2B2A2

Figure 11:
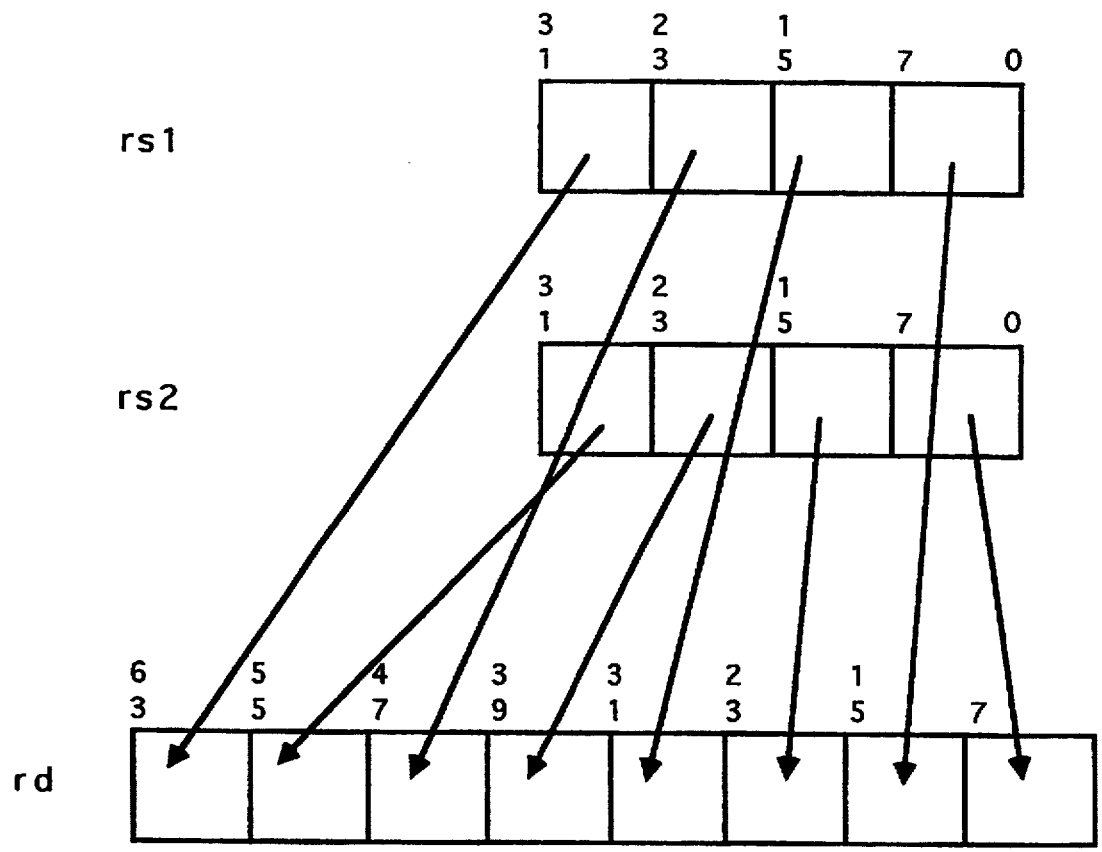
FIG. 11 schematically illustrates the operation of the fpmerge instruction.

FIG. 11 schematically illustrates the operation of the fpmerge instruction.

ALIGNMENT INSTRUCTIONS

| opcode | opf | operation |
|---|---|---|
| ALIGNADDRESS | 000011000 | Calculate address for misaligned data access |
| ALIGNADDRESS_LITTLE | 000011010 | Calculate address for misaligned data access, little-endian |
| FALIGNDATA | 001001000 | Perform data alignment for misaligned data |

Format (3):

| 10 | rd | 110110 | rs1 | opf | rs2 |
|---|---|---|---|---|---|
| 31 30 29 | 25 24 | 19 18 | 14 13 | 5 4 | 0 |

Suggested Assembly Language Syntax

| | |
|---|---|
| alignaddr | reg$_{rs1}$, reg$_{rs2}$, reg$_{rd}$ |
| alignaddrl | reg$_{rs1}$, reg$_{rs2}$, reg$_{rd}$ |
| faligndata | freg$_{rs1}$, freg$_{rs2}$, freg$_{rd}$ |

Description:

ALIGNADDRESS adds two integer registers, rs1 and rs2, and stores the result, with the least significant 3 bits forced to zero, in the integer rd register. The least significant 3 bits of the result are stored in the GSR.alignaddr_offset field.

ALIGNADDRESS_LITTLE is the same as ALIGNADDRESS, except that the 2's complement of the least significant 3 bits of the result is stored in GSR.align_offset.

NOTE: ALIGNADDRL is used to generate the opposite-endian byte ordering for a subsequent FALIGNDATA operation.

APPENDIX A-continued

FALIGNDATA concatenates two 64-bit floating-point registers, rs1, and rs2, to form a 16-byte value; it stores the result in the 64-bit floating-point rd register. Rs1 is the upper half and rs2 is the lower half of the concatenated value. Bytes in this value are numbered from most significant to least significant, with the most significant byte being byte 0. Eight bytes are extracted from this value, where the most significant byte of the extracted value is the byte whose number is specified by the GSR_align_offset field.

A byte-aligned 64-bit load can be performed as follows:

```
Code Example Byte aligned 64-bit load
    alignaddr   Address, Offset, Address
    ldd         (Address_, %f0
    ldd         (Address + 8), %f4
    faligndata  %f0, %f4, %f8
Traps:

fp_disabled
```

What is claimed is:

1. In a computer system having a processor, a method for performing table-lookup transformation, through a look-up table, a source image having a plurality of source pixels to derive a destination image having a plurality of destination pixels, comprising the steps of:

deriving, for each value in a source pixel of said plurality of source pixels, a look-up result, said each value in said source pixel of said plurality of source pixels representing an integer value, said look-up result representing an integer value in a corresponding destination pixel of said plurality of destination pixels;

loading a plurality of said look-up results that are integer values into a plurality of graphics registers in said processor, wherein said loading includes loading a bit pattern having fewer bits than the number of bits in said graphics registers into one of said graphics registers, said bit pattern representing one of said lookup results;

accumulating said plurality of said look-up results that are integer values in said plurality of graphics registers into an accumulation register in said processor, said accumulation register representing a register other than an integer register of said processor; and storing said accumulation register into said destination image.

2. The method of claim 1 wherein said accumulation register is a 32-bit float register.

3. The method of claim 1 wherein said accumulation register is a 64-bit double register.

4. The method of claim 1 wherein said graphics registers and said accumulation register are 64-bit double registers.

5. The method of claim 1 wherein said loading step comprises the step of utilizing a short load procedure to load a bit pattern that is misaligned in memory into one of said graphics registers, said bit pattern representing one of said look-up results.

6. The method of claim 1 wherein said accumulating step comprises the step of utilizing a register data extraction and rearrangement procedure to accumulate said look-up results in said graphics registers into said accumulation register.

7. The method of claim 6 wherein said register data extraction and rearrangement procedure is used with variable starting points.

8. The method of claim 6 wherein said register data extraction and rearrangement procedure is used with a fixed starting point.

9. The method of claim 6 wherein said register data extraction and rearrangement procedure is implemented by a merge procedure.

10. The method of claim 1 wherein storing step comprises the step of utilizing a partial store procedure to store selective bits of said accumulation register into said destination image.

11. A computer readable medium containing program instructions for performing, via a processor, table-lookup transformation through a look-up table a source image having a plurality of source pixels to derive a destination image having a plurality of destination pixels, said instructions performing the steps of:

deriving, for each value in a source pixel of said plurality of source pixels, a look-up result, said each value in said source pixel of said plurality of source pixels representing an integer value, said look-up result representing an integer value in a corresponding destination pixel of said plurality of destination pixels;

loading a plurality of said look-up results that are integer values into a plurality of graphics registers in said processor, wherein said loading includes loading a bit pattern having fewer bits than the number of bits in said graphics registers into one of said graphics registers, said bit pattern representing one of said lookup results;

accumulating said plurality of said look-up results that are integer values in said plurality of graphics registers into an accumulation register in said processor, said accumulation register representing a register other than an integer register of said processor; and storing said accumulation register into said destination image.

12. The computer readable medium of claim 11 wherein said accumulation register is a 64-bit double register.

13. The computer readable medium of claim 11 wherein said accumulating step comprises the step of utilizing a register data extraction and rearrangement procedure to accumulate said look-up results in said graphics registers into said accumulation register.

14. The computer readable medium of claim 13 wherein said register data extraction and rearrangement procedure is used with variable starting points.

15. The computer readable medium of claim 13 wherein said register data extraction and rearrangement procedure is used with a fixed starting point.

16. The computer readable medium of claim 13 wherein said register data extraction and rearrangement procedure is implemented by a merge procedure.

17. In a computer system having a processor, a method for performing table-lookup transformation, through a look-up table, a source image having a plurality of source pixels to derive a destination image having a plurality of destination pixels, comprising:

deriving, for each value in a source pixel of said plurality of source pixels, a look-up result, said each value in said source pixel of said plurality of source pixels representing an integer value, said look-up result representing an integer value in a corresponding destination pixel of said plurality of destination pixels; and accumulating said plurality of said look-up results that are integer values into an accumulation register in said processor, said accumulation register representing one of a float register and a double register; wherein at least one of said lookup results is represented, prior to said accumulating, by fewer bits than the number of bits in said accumulation register, and storing said accumulation register into said destination image.

18. In a computer system having a processor, a method for performing table-lookup transformation, through a look-up table, a source image having a plurality of source pixels to derive a destination image having a plurality of destination pixels, comprising:

deriving, for each value in a source pixel of said plurality of source pixels, a look-up result, said each value in said source pixel of said plurality of source pixels representing an integer value, said look-up result representing an integer value in a corresponding destination pixel of said plurality of destination pixels; and accumulating said plurality of said look-up results that are integer values into an accumulation register in said processor, said accumulation register representing a register other than an integer register of said processor, said accumulation register being employed to store said look-up results as a bit pattern irrespective of a type of said accumulation register; wherein at least one of said lookup results is represented, prior to said accumulating, by fewer bits than the number of bits in said accumulation register, and storing said accumulation register into said destination image.

19. The method of claim 18 wherein said accumulation register is a 64-bit double register.

\* \* \* \* \*